3,531,296
BUFFERED INSTANT TEA EXTRACT
Ronald H. Smithies, Teaneck, N.J., assignor to Thomas J. Lipton, Inc., Englewood Cliffs, N.J., a corporation of Delaware
No Drawing. Filed Mar. 7, 1967, Ser. No. 621,146
Int. Cl. A23f 3/00
U.S. Cl. 99—77      7 Claims

ABSTRACT OF THE DISCLOSURE

A powdered instant tea extract containing an edible acid/alkali metal salt buffer system to control the pH of the final tea beverage and prevent cloudiness, discoloration and scum formation in the tea beverage, and a process for preparing the buffered tea extract comprising treating an aqueous tea extract with an ion exchange resin, adding an edible acid/alkali metal salt buffer system and drying.

---

This invention relates to improved powdered instant tea extracts and a process for preparing them, and more particularly to powdered instant tea extracts containing a pH buffering system of an edible acid and its alkali metal salt, and a process for preparing them.

The beverage qualities of both leaf and instant soluble teas are partly determined by the water with which they are prepared. Teas brewed in hard water have an undesirable grey-brown color and there may be pronounced foaming developing into a persistent scum when milk is added to the tea beverage. These defects are largely eliminated if the tea is brewed in a pot and decanted into a cup prior to adding milk. However, the undesirable discoloration and scumming are very marked when soluble instant tea extracts are dissolved in hard water, because instant tea extracts are very sensitive to the character of the water used to reconstitute the extracts.

The deleterious effects are also dependent upon the chemical and physical properties of the tea. For example, it is possible to choose a blend of highly colored teas so that the undesirable color changes will be less noticeable. It is also possible to prepare dense tea extract powders which will produce less foam and scum than spray-dried powders. These are only partial solutions to the problem, however, and they restrict the choice of raw material and processing techniques which are available for preparing soluble tea extracts.

It is therefore an objective of this invention to provide a soluble powdered instant tea extract which will not cloud, foam or form scum upon reconstitution with naturally hard water and/or milk. It is furthermore an object of this invention to provide a method for preparing such an instant tea extract.

Investigation of the chemical constituents of naturally hard water has disclosed that two factors are responsible for the formation of the disagreeable color, cloudiness and scum in tea beverages. The principal factor is the bicarbonate alkalinity or temporary hardness of the water. The other factor is the presence of calcium salts. The results of investigation leading to this invention show that the appearance of the beverage is related to the final pH of the beverage after milk has been added. When the pH is below about 6.0 the color is fully retained and there is no persistent formation of scum. At a pH of about 6.3 or higher, increasing greyness appears and scum forms from the calcium salts present in the tea beverage. The calcium salts are present in the beverage as a component of the tea powder (extracted from the leaf or added during processing) or as a constituent of naturally hard water.

According to the invention, the undesirable effects of discoloration and scum formation may be avoided by adding a pH buffering system to the tea extract during processing. The buffer consists of an edible acid and its alkali metal salt. The pH of the buffer system should be about 4.5–4.8, so that the pH of the final reconstituted tea beverage containing milk should be between about 5.2 and about 6.3, depending on the degree of hardness in the water used for reconstitution of the instant tea.

Prior to addition of the buffer to the tea extract, the extract is processed by means known in the art. An aqueous extract is prepared from tea leaves and the aroma may be stripped off and concentrated if desired. At this point the extract has a pH of about 4.7 to 4.9. The extract is then decreamed and dehazed by the addition of calcium chloride. As an alternative to the decreaming and dehazing steps, according to the invention, the aqueous extract preferably is treated with an ion exchange resin, such as Amberlite 1R-120 HC.P. The ion exchange resin partially removes potassium and calcium ions from the extract and replaces them with hydrogen ions, thereby slightly acidifying the extract to about pH 4.4 to 4.6. The removal of calcium ions brightens the color and improves the flavor of the reconstituted tea beverage in addition to reducing the likelihood of calcium scum formation at the higher pH levels.

Following the decreaming and dehazing or ion exchange steps, the acid buffer system is added to the tea extract. Although any acid buffer system could be used, it is preferred to use an edible acid and its alkali metal salt, such as sodium or potassium. Phosphoric, malic, hydrochloric and tartaric acids have been tested. They are effective in controlling the pH of the beverage, but produce marked taints in the flavor of the tea beverage and are therefore less desirable.

The most suitable edible acid buffer is a mixture of citric acid and potassium citrate. Use of this acid and its salt produces no marked flavor taint and effectively controls the final pH of the tea beverage.

According to the invention, the amount of buffering mixture added to the extract depends upon the weight of the solids present in the aqueous tea extract. The factor which determines the relationship between the buffer and the tea solids is the pH of the final tea beverage containing milk. Most tea drinkers who add milk to their tea use from about 5% to about 10% milk based upon the volume of reconstituted tea beverage. The objective is to buffer the tea beverage so that the pH of the tea beverage containing milk lies between about 5.2 and about 6.3. A tea beverage with a final pH between these extremes possesses acceptable color and does not form scum. It has been found that about 5% to 10% (by weight of tea solids in the aqueous tea extract) of a buffer mixture having a pH of 4.5–4.8 will maintain the final pH of the tea beverage within the desired range. The ratio of edible acid to its alkali salt in the buffer mixture can therefore range from about 1:1 to 1:2. Tea extracts processed according to known means, such as aqueous extraction from tea leaves by counter-current extraction methods, normally have a pH of about 4.7–4.9. If the extract is treated with an ion exchange resin, the pH is reduced to approximately 4.4 to 4.6.

It should be noted that there is a lower limit to the acceptable final pH range. A final pH below about 5.2 imparts an acidic taste to the tea beverage and precipitates milk proteins from the tea containing milk. The addition of the buffer system to the tea extract buffers the final instant tea extract so that upon reconstitution with either hard or soft water the pH remains between 5.2 and 6.3. Excessive amounts of acid in the tea extract might not harm the final tea beverage if the instant tea extract were reconstituted with hard water, since the hard water could increase a low initial pH to a point within the acceptable range. However, household tap water varies in its alkalinity, and reconstitution with soft tap water could allow a low pH tea extract to remain below the minimum acceptable pH level for final teas, thus causing curdling of the milk proteins. It is therefore important not only to buffer the final product, but also to ensure that excessive acidification of the extract does not occur in the process.

Following the addition of the buffer system, the buffered tea extract may be combined with the concentrated aroma or other necessary components for instant tea, such as filler, and then be dried by means known in the art to form a powdered instantly soluble tea extract.

The following examples are intended only to illustrate the process of the invention and should not be construed as limiting the scope of the claimed invention in any way. The scope of the invention is defined only by the appended claims.

EXAMPLE I

Preparation of instant tea using calcium chloride clarification and addition of citrate buffer 26 lb. Indian black tea leaf were extracted with 240 lb. deionized water in a stainless steel jacketed vessel for 12 minutes at 167° F. The digest was centrifuged and pumped through a 100 mesh screen to give 203 lb. extract with a soluble solids content of 3.49%. Yield at the extraction stage was 27.2%. The aroma was stripped off under reduced pressure to leave a 159 lb. extract of the soluble constituents, with a solids content of 4.28%. 77.2 lb. of the stripped extract were treated with 36 grams $CaCl_2 \cdot 2H_2O$ and held for 30 minutes at 120° F. The insoluble solids made up of calcium complexes and tea cream were removed by centrifugation to yield a clarified extract, weighing 71.3 lb. with 3.97% soluble solids. Solids lost during clarification comprised 14.0%. 30 lb. of the clarified extract were treated with 38 grams of a mixture of potassium citrate and citric acid in the proportions 2:1 by weight. The citrate buffer was added as a 25% solution in water. The buffered extract was evaporated under reduced pressure to a syrup containing 38.7% solids and this was dried in a vacuum dryer to give a light powder with a moisture content of 1.5%.

The powder was compared with a control prepared by evaporation and drying of the clarified extract omitting the addition of buffer salts. In deionized water (representing completely soft tap water) the beverage prepared from the buffered powder (dissolved at 0.35% solids and with the addition of 5% v./v. milk), was slightly lighter and more yellow in color than the control. In very hard water, of 300 p.p.m. hardness, the color of the buffered beverage retained its reddish hue contrasting with the grey-brown hue and scummy surface of the unbuffered control. Both products had an acceptable flavor.

EXAMPLE II

Preparation of instant tea powder using ion-exchange clarification alone and with addition of citrate buffer 30.8 lb. of once-extracted black tea leaf (moisture content 69.6%) was extracted with 116.2 lb. deionized water in a stainless steel jacketed vessel for 12 minutes at 200° F. The extract (109.3 lb.) was centrifuged free from spent leaves and used for the extraction of 13 lb. blended black tea leaves for 12 minutes at 167° F. The digest was centrifuged and pumped through a 100 mesh screen to give 88.2 lb. extract with a solids content of 4.86%. Yield at the extraction stage was 32.9%. The extract was returned to the vessel and the temperature maintained at 150° F. to prevent any separation of cream. Foam building up at the surface was removed. The extract was circulated over approximately 100 grams of washed Amberlite resin, 1R–120 HC.P., resting on a 100 mesh screen, until the pH was lowered from an initial 4.90 to a final 4.55. No separation of solids occurred during this treatment. The clarified extract was concentrated under reduced pressure to a syrup containing 38.5% solids. 5 lb. of the concentrate were treated with 59 grams of a mixture of potassium citrate and citric acid in the proportions 5:3 by weight. The citrate buffer was added as a 25% solution in water. Two powders were prepared by vacuum drum drying the concentrates. The first, with added citrate buffer, was a light powder, with a moisture content of 2.1%. The second was prepared from the concentrate without added buffer and had moisture content of 1.4.

The two tea powders were reconstituted with soft deionized boiling water. About 5% milk, based upon the volume of reconstituted beverage, was added to each beverage. The two beverages were slightly different in appearance, with the unbuffered beverage having the deeper hue. In mildly hard water (100 p.p.m. hardness) both beverages were very similar in appearance, but in very hard water (300 p.p.m. hardness) the unbuffered beverage lost its red hue and scum formed on the surface. The citrate buffered beverage possessed a deeper color than in the softer water and the initial foam on its surface broke down instead of forming the persistent scum encountered with unbuffered teas. All teas had an acceptable flavor.

I claim:
1. A process for preparing improved soluble powdered tea extracts comprising forming an aqueous extract of tea having calcium ions, treating said extract with an ion exchange resin to remove partially said calcium ions, adding to said treated tea extract a pH buffer system comprising a mixture of an edible acid and its alkali metal salt having a weight ratio of from about 1:1 to 1:2, and having a pH of about 4.6 to about 4.8, the amount of said buffer system being sufficient to provide a pH of about 5.2 to about 6.3 in the reconstituted tea beverage after the addition of about 5% to 10% milk, and drying the tea extract to produce a powdered buffered tea extract.

2. A process according to claim 1, wherein the aqueous tea extract is treated with an ion exchange resin to reduce the pH of the tea extract to about 4.4 to 4.6 prior to the addition of the buffer system.

3. A process for preparing improved soluble powdered tea extracts comprising forming an aqueous extract of tea, adding to the tea extract a pH buffer system comprising a mixture of an edible acid and its alkali metal salt having a weight ratio of said acid to said salt of from about 1:1 to about 1:2, and having a pH of about 4.6 to about 4.8, the amount of said buffer system being sufficient to provide a pH of about 5.2 to about 6.3 in the reconstituted tea beverage after the addition of about 5% to about 10% milk, and drying the tea extract to produce a powdered buffer tea extract.

4. A process according to claim 3, wherein the aqueous tea extract is clarified by the addition of calcium chloride prior to the addition of the buffer system.

5. A process according to claim 3, wherein the edible acid and its alkali salt comprise citric acid and potassium citrate.

6. A powdered tea extract prepared by the process of claim 5.

7. A powdered tea extract prepared by the process of claim 3.

References Cited

UNITED STATES PATENTS

| | | | |
|---|---|---|---|
| 2,891,865 | 6/1959 | Seltzer | 99—77 |
| 2,891,866 | 6/1959 | Schroeder | 99—77 |
| 2,963,368 | 12/1960 | Greenbaum | 99—77 |
| 3,163,539 | 12/1964 | Barch | 99—77 |

LIONEL M. SHAPIRO, Primary Examiner

J. R. HOFFMAN, Assistant Examiner